United States Patent
Walker et al.

(10) Patent No.: US 11,561,906 B2
(45) Date of Patent: Jan. 24, 2023

(54) RINSING CACHE LINES FROM A COMMON MEMORY PAGE TO MEMORY

(71) Applicant: ADVANCED MICRO DEVICES, INC., Santa Clara, CA (US)

(72) Inventors: William L. Walker, Fort Collins, CO (US); William E. Jones, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 85 days.

(21) Appl. No.: 15/839,089

(22) Filed: Dec. 12, 2017

(65) Prior Publication Data
US 2019/0179770 A1  Jun. 13, 2019

(51) Int. Cl.
*G06F 12/12* (2016.01)
*G06F 12/128* (2016.01)
*G06F 12/0882* (2016.01)

(52) U.S. Cl.
CPC ........ *G06F 12/128* (2013.01); *G06F 12/0882* (2013.01); *G06F 12/12* (2013.01); *G06F 2212/601* (2013.01)

(58) Field of Classification Search
CPC ...... G06F 12/12; G06F 12/121; G06F 12/126; G06F 12/127; G06F 12/128; G06F 12/0882; G06F 2212/601
See application file for complete search history.

(56) References Cited

U.S. PATENT DOCUMENTS

| | | | | |
|---|---|---|---|---|
| 5,077,826 A * | 12/1991 | Grohoski | ............ | G06F 12/1063 711/207 |
| 5,630,088 A * | 5/1997 | Gupta | ................. | G06F 12/1036 711/207 |
| 5,752,261 A * | 5/1998 | Cochcroft, Jr. | ...... | G06F 12/0864 711/128 |
| 6,973,543 B1 | 12/2005 | Hughes | | |
| 9,141,543 B1 * | 9/2015 | Schuttenberg | ...... | G06F 12/0802 |
| 10,133,678 B2 * | 11/2018 | Eckert | ................... | G06F 12/126 |
| 10,303,602 B2 | 5/2019 | Kayiran et al. | | |
| 2003/0023814 A1 * | 1/2003 | Barroso | ............. | G06F 12/0828 711/122 |

(Continued)

FOREIGN PATENT DOCUMENTS

JP  2013004091  1/2013

OTHER PUBLICATIONS

Architectural Support for a Variable Granularity Cache Memory System by Kumar (Year: 2010).*
Cache Addressing UMN as published in 2016 at https://www.d.umn.edu/~gshute/arch/cacheaddressing.xhtml (Year: 2016).*
Mapping the Intel Last-Level Cache by Yarom (Year: 2015).*
Discuss the effect of page size on the performance of operating system by Rishika (Year: 2016).*

(Continued)

*Primary Examiner* — Paul M Knight

(57) ABSTRACT

A processing system rinses, from a cache, those cache lines that share the same memory page as a cache line identified for eviction. A cache controller of the processing system identifies a cache line as scheduled for eviction. In response, the cache controller, identifies additional "dirty victim" cache lines (cache lines that have been modified at the cache and not yet written back to memory) that are associated with the same memory page, and writes each of the identified cache lines to the same memory page. By writing each of the dirty victim cache lines associated with the memory page to memory, the processing system reduces memory overhead and improves processing efficiency.

19 Claims, 5 Drawing Sheets

(56) References Cited

U.S. PATENT DOCUMENTS

| | | | |
|---|---|---|---|
| 2009/0150875 A1* | 6/2009 | Maier | G06F 12/0253 717/158 |
| 2011/0231593 A1* | 9/2011 | Yasufuku | G06F 12/12 711/3 |
| 2011/0276763 A1 | 11/2011 | Daly et al. | |
| 2012/0260041 A1 | 10/2012 | Habusha et al. | |
| 2013/0124802 A1 | 5/2013 | Glasco et al. | |
| 2013/0201770 A1* | 8/2013 | Harris | G11C 5/025 365/189.011 |
| 2013/0346699 A1 | 12/2013 | Walker | |
| 2016/0253259 A1* | 9/2016 | Jin | G06F 12/1054 711/122 |
| 2017/0083724 A1* | 3/2017 | Chhabra | G06F 12/1408 |
| 2017/0168957 A1* | 6/2017 | Christidis | G06F 12/0811 |

OTHER PUBLICATIONS

International Search Report and Written Opinion dated Jan. 15, 2019 for corresponding International Application No. PCT/US2018/052415, 12 pages.

International Preliminary Report on Patentability dated Jun. 25, 2020 for International Application No. PCT/US2018/052415, 9 pages.

Extended European Search Report dated Aug. 9, 2021 for Application No. 18888210.4, 11 pages.

Translation of First Examination Report dated Apr. 9, 2022 for Indian Patent Application No. 202017023983, 6 pages.

Office Action dated Nov. 1, 2022 for Japanese Application No. 2020-531657, 9 pages.

* cited by examiner

RINSING CACHE LINES FROM A COMMON MEMORY PAGE TO MEMORY

BACKGROUND

A processing system often utilizes a memory hierarchy to support data storage for processing nodes of the system. The memory hierarchy includes multiple levels of caches available for access by one or more processor cores of the node, as well as a main memory to store all the data available to be manipulated by program instructions executing at the processor cores. To improve processing efficiency, the processing system can implement a memory management scheme, wherein the processing system moves data to different levels of the memory hierarchy according to the management scheme. For example, under some memory management schemes, the processing system moves data recently accessed by a processor core to a level of the memory hierarchy closer to the core, so that the data can be accessed relatively quickly in the future. In addition, the memory management scheme governs how data is replaced at a given level of the memory hierarchy as new data is received at that memory hierarchy level, and how and when data is copied between memory hierarchy levels. However, conventional memory management schemes may execute these data replacement and transfer operations inefficiently, thereby consuming an undesirably high amount of system resources.

BRIEF DESCRIPTION OF THE DRAWINGS

The present disclosure may be better understood, and its numerous features and advantages made apparent to those skilled in the art, by referencing the accompanying drawings. The use of the same reference symbols in different drawings indicates similar or identical items.

DETAILED DESCRIPTION

FIGS. 1-5 illustrate techniques for improving memory management efficiency at a processing system by rinsing, from a cache, those cache lines that share the same memory page as a cache line identified for eviction. A cache controller of the processing system identifies a cache line as scheduled for eviction. In response, the cache controller identifies additional "dirty victim" cache lines (cache lines that have been modified at the cache and not yet written back to memory) that are associated with the same memory page, and writes each of the identified cache lines to the same memory page. By writing each of the dirty victim cache lines associated with the memory page to memory, the processing system reduces memory overhead and improves processing efficiency.

To illustrate, one of the benchmarks of processing efficiency is "write locality", which refers, at least in part, to how often the processing system executes sequential write operations, or write operations relatively close in time, to the same memory page. In particular, because preparing a memory page for a write operation consumes system resources, increasing write locality reduces the number of times the memory page is prepared, and therefore reduces system resource consumption. Conventional cache controllers write cache lines to memory only when they are chosen for eviction by a replacement policy. Those cache lines tend to be from different memory pages than other cache lines recently evicted. Using the techniques described herein, a cache controller rinses, from a cache, those cache lines that share the same memory page as a cache line that is being evicted, thus increasing write locality and improving processing efficiency.

Figure 1:
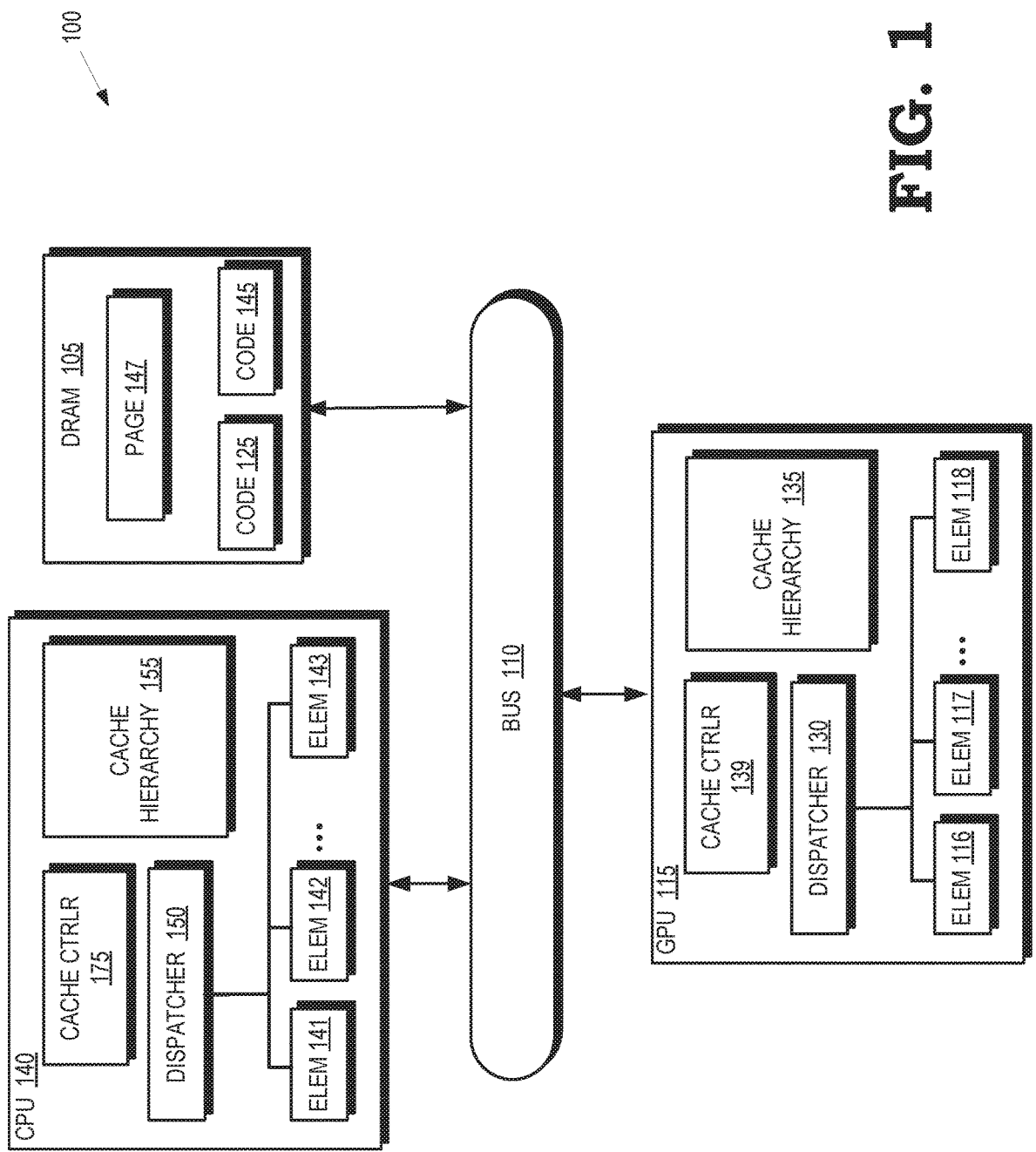
FIG. 1 is a block diagram of a processing system that rinses, from a cache, cache lines that share the same memory page as a cache line that is being evicted according to some embodiments.

FIG. 1 is a block diagram of a processing system 100 according to some embodiments. The processing system 100 is generally configured to execute sets of instructions (e.g. computer programs or applications) on behalf of an electronic device. Accordingly, the processing system can be incorporated into any of a number of electronic devices, such as a desktop or laptop computer, server, tablet, smartphone, game console, and the like. To support execution of the sets of instructions, the processing system 100 includes or has access to a memory 105 or other storage component that is implemented using a non-transitory computer readable medium such as a dynamic random access memory (DRAM). However, the DRAM memory (DRAM) 105 can also be implemented using other types of memory including static random access memory (SRAM), nonvolatile RAM, and the like. The processing system 100 also includes a bus 110 to support communication between entities implemented in the processing system 100, such as the DRAM 105. The DRAM 105 is divided into a set of logical segments referred to herein as pages (e.g., memory page 147). In some embodiments, each memory page shares common addressing or other access circuitry, so that multiple sequential accesses to the same memory page consumes fewer resources than sequential accesses to different memory pages. As described further herein, the processing system 100 implements a memory management scheme to encourage sequential accesses to the same memory page, thereby conserving system resources and enhancing processing efficiency.

The processing system 100 includes a graphics processing unit (GPU) 115 that is configured to render images for presentation on a display 120. For example, the GPU 115 can render objects to produce values of pixels that are provided to the display 120, which uses the pixel values to display an image that represents the rendered objects. Some embodiments of the GPU 115 are used for general purpose computing. In the illustrated embodiment, the GPU 115 implements multiple processing elements 116, 117, 118 (collectively referred to herein as "the processing elements 116-118") that are configured to execute instructions concurrently or in parallel. In the illustrated embodiment, the GPU 115 communicates with the DRAM 105 over the bus 110. However, some embodiments of the GPU 115 communicate with the DRAM 105 over a direct connection or via other buses, bridges, switches, routers, and the like. The GPU 115 executes instructions stored in the DRAM 105, and the GPU 115 stores information in the DRAM 105 such as the results of the executed instructions. For example, the DRAM 105 can store a copy 125 of instructions from a program code that is to be executed by the GPU 115. The GPU 115 includes a dispatcher 130 that is configured to dispatch instructions for execution by the processing elements 116-118.

The GPU 115 also implements a cache hierarchy 135 that includes one or more levels of cache that are used to cache instructions or data for relatively low latency access by the processing elements 116-118. The cache hierarchy 135 includes a number of individual caches and corresponding cache locations (cache lines) as further described in detail in FIG. 2. The GPU 115 also includes a cache controller 139 for controlling movement of data between levels of the cache hierarchy 135, as well as movement of data between the cache hierarchy 135 and the DRAM 105, as described further below.

The processing system 100 also includes a central processing unit (CPU) 140 that implements multiple processing elements 141, 142, 143, which are collectively referred to herein as "the processing elements 141-143". The processing elements 141-143 are configured to execute instructions concurrently or in parallel. For example, the processing elements 141-143 are configured to execute multiple threads concurrently or in parallel. The CPU 140 includes a dispatcher 150 that is configured to dispatch instructions for execution by the processing elements 141-143. The CPU 140 is connected to the bus 110 and therefore communicates with the GPU 115 and the DRAM 105 via the bus 110. The CPU 140 executes instructions such as program code 145 stored in the DRAM 105, and the CPU 140 also stores information in the DRAM 105 such as the results of the executed instructions.

The CPU 140 implements a cache hierarchy 155 that includes one or more levels of caches that are used to cache instructions or data for relatively low latency access by the processing elements 141-143. Although the cache hierarchy 155 is depicted as external to the processing elements 141-143, some embodiments of the processing elements 141-143 incorporate corresponding caches that are interconnected to the cache hierarchy 155. Details of the cache hierarchy 155 are described in greater detail below with respect to FIG. 2.

The CPU 140 also includes a cache controller 175 for receiving and sending the first and subsequent cache lines into and out of the cache hierarchy 155, movement of data between levels of the cache hierarchy 155, as well as movement of data between the cache hierarchy 155 and the DRAM 105. The operations of the cache controller 175 are described in further detail below. It will be appreciated that the cache controller 139 performs similar operations with respect to the cache hierarchy 135.

The cache controller 175 implements a specified memory management scheme for the cache hierarchy 155 and the DRAM 105 by managing various aspects of the entries of the corresponding caches. To illustrate, in the course of executing instructions, the processing elements 141-143 generate operations, referred to as memory access operations, to retrieve or modify data from the cache hierarchy 155. Examples of memory access operations include write operations, to write data to a memory location, and read operations, to read data from a memory location. Each memory location corresponds to a different memory address, and each memory access operation includes the memory address targeted by the memory access operation. The cache controller 175 receives memory access operations from the processing elements 141-143 and executes the memory access operations by, in the case of read operations, providing data to the processing elements 141-143, or by, in the case of write operations, modifying data at one or more entries (referred to as cache lines) of the cache hierarchy 155.

In the course of executing memory access operations, the cache controller 175 moves data between different levels of the cache hierarchy 155, and between the cache hierarchy 155 and the DRAM 105, based on the specified memory management scheme. For example, in some embodiments the cache controller 175 enhances memory access efficiency by moving recently accessed data (that is, data that was recently targeted by a memory access operation) to a higher level of the cache hierarchy 155 so that the data is "closer" in the cache hierarchy 155 to the processing elements 141-143, and therefore can be accessed by the processing elements 141-143 more quickly. In some embodiments, the cache controller 175 transfers data between levels of the memory hierarchy speculatively, at least in part, based on detected patterns in the memory access operations generated by the processing elements 141-143. In addition, the cache controller 175 manages the transfer of data between the cache hierarchy 155 and the DRAM 105. For example, in response to determining that data targeted by a memory operation is not stored at a cache line of the cache hierarchy 155, the cache controller 175 transfers the data targeted by the memory operation from the DRAM 105 to one or more cache lines of the cache hierarchy 155.

The cache controller 175 is further configured to maintain data coherency between different levels of the cache hierarchy 155, and between the cache hierarchy 155 and the DRAM 105. In particular, when data is modified at a cache line of the cache hierarchy 155, the cache controller ensures, as described further below, that the modified data is stored at other cache lines of the cache hierarchy 155, and at the entry of the DRAM 105, corresponding to the memory address of the modified data, before the modified data can be accessed by another processing element, processor core, processing unit, and the like.

Both to manage the transfer of data between levels of the cache hierarchy 155 and to maintain data coherency, the cache controller 175 maintains coherency status information for each cache line of the cache hierarchy 155. The coherency status information for a cache line indicates whether the cache line stores valid data, and therefore is not eligible to be replaced by data associated with a different memory address, or invalid data, and therefore is eligible to be replaced by data associated with a different memory address. In addition, for cache lines having a valid status, the coherency status information indicates whether the data at the cache line is in a modified state—that is whether 1) the data at the cache line has been modified from its original state when it was stored at the cache line and 2) the modified data at the cache line has not been copied to a lower level of the cache hierarchy 155 or to the DRAM 105. In some embodiments, the coherency status information indicates additional coherency aspects, such as whether the data stored at the cache line is exclusively accessible by the CPU or is shared with other processing units.

To transfer data between levels of the cache hierarchy 155 and to maintain data coherency, the cache controller 175 performs at least two types of operations, referred to herein as eviction operations and rinse operations. In particular, the cache controller 175 performs an eviction operation to evict valid data from a cache line in response to, for example, determining that received data is to be stored at the cache line, based on the memory management scheme implemented by the cache controller 175. To perform an eviction operation for a cache line, the cache controller 175 determines if the cache line is in a modified state. If not, the cache controller 175 sets the status of the cache line to an invalid state. If the cache line is in a modified state, the cache controller 175 copies the contents of the cache line to one or more of a lower level of the cache hierarchy 155 and the DRAM 105.

The cache controller 175 performs a rinse operation to maintain data coherency between different levels of the cache hierarchy 155. To perform a rinse operation, the cache controller 175 identifies one or more cache lines at a given level of the cache hierarchy 155 as being in the valid state and the modified state, and copies the contents of the modified cache line to one or more lower levels of the cache hierarchy. In contrast to the eviction operation described above, the cache controller 175 maintains the identified cache lines in the valid state. In some embodiments, the cache controller 175 performs the rinse operation periodically, or in response to identifying one or more specified conditions at the CPU 140, such as execution of a particular instruction, a change in a thread being executed, and the like.

In some embodiments, the cache controller 175, in response to evicting a cache line, performs a rinse operation for cache lines associated with the same DRAM 105 page as the evicted cache line. In particular, in response to identifying a cache line for eviction, the cache controller 175 identifies other cache lines at the same level of the cache hierarchy 155 that are assigned to memory addresses of the same page as the cache line identified for eviction. The cache controller then writes the evicted cache line and the additional identified cache lines to the DRAM 105 via multiple write operations to the same memory page, thus improving processor efficiency. Further, in some embodiments, the CPU 140 sets the status of the rinsed cache lines to a clean (i.e., unmodified) state.

Figure 2:
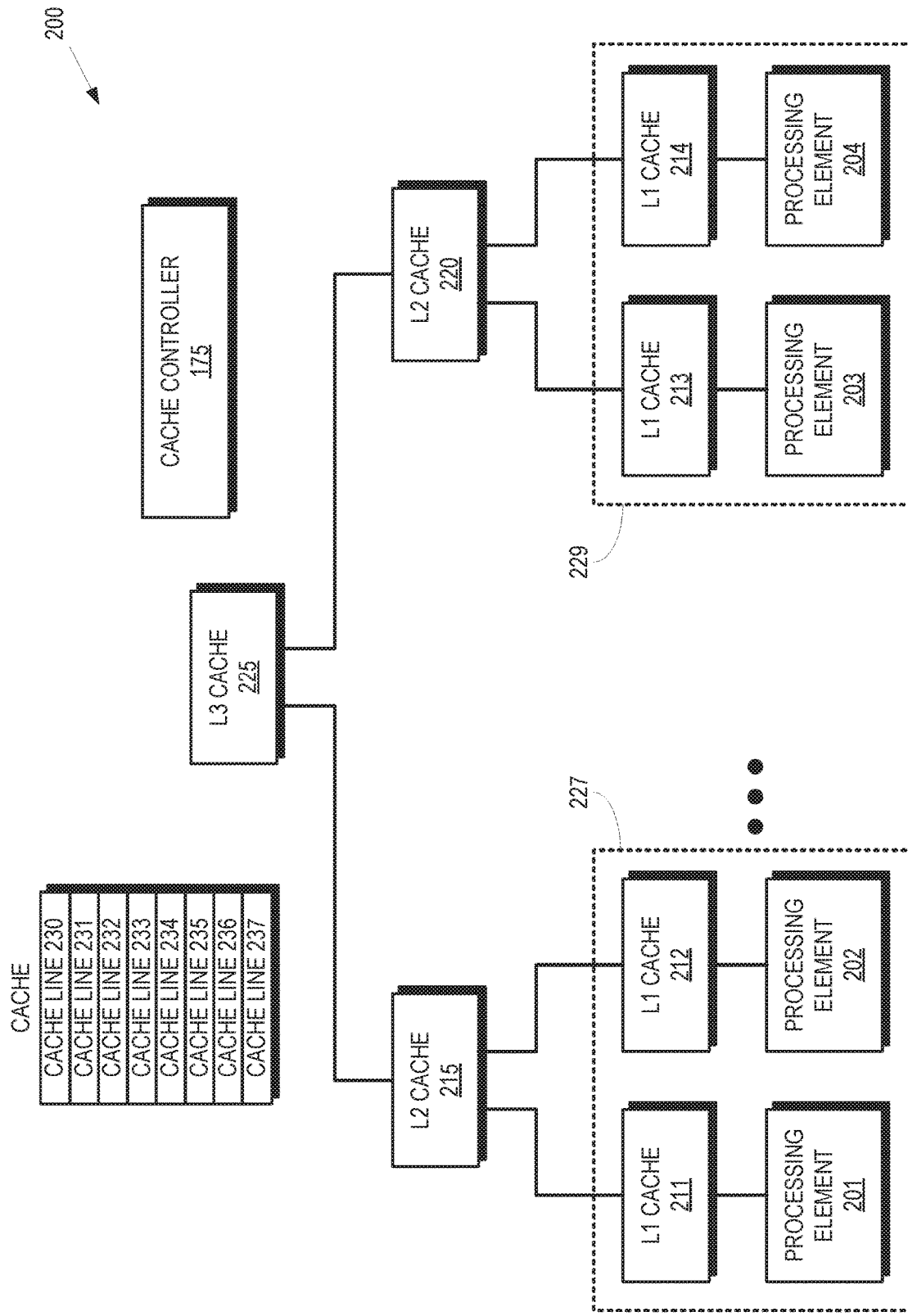
FIG. 2 is a block diagram of a cache hierarchy as used in the processing system of FIG. 1 according to some embodiments.

FIG. 2 is a block diagram of a cache hierarchy 200, corresponding to one of the cache hierarchies 135 and 155 of FIG. 1. The cache hierarchy 200 caches information such as instructions or data for processing elements 201, 202, 203, 204, which are collectively referred to herein as "the processing elements 201-204." The processing elements 201-204 are used to implement some embodiments of the processing elements 116-118, and 141-143 as shown in FIG. 1.

The cache hierarchy 200 includes three levels of caches: a first level including L1 caches 211, 212, 213, 214 (collectively referred to herein as "the L1 caches 211-214"), a second level including L2 caches 215, 220, and a third level including an L3 cache 225. However, some embodiments of the cache hierarchy 200 include more or fewer levels of caches. Although the L1 caches 211-214 are depicted as separate hardware structures that are interconnected to the corresponding processing elements 201-204, some embodiments of the L1 caches 211-214 are incorporated into the hardware structures that implement the processing elements 201-204. Each level of cache contains a plurality of individual cache lines (e.g., cache lines 230-237).

The L1 caches 211-214 are used to cache information for access by the corresponding processing elements 201-204, and are private caches for the corresponding processing elements. For example, the L1 cache 211 is configured to cache information for the processing element 201. The processing element 201 can therefore issue memory access requests to the L1 cache 211. The requested information is returned if the memory access request hits in the L1 cache 211. If the memory access request misses (that is, the requested data is not present) in the L1 cache 211, the memory access request is forwarded to the next lower cache level (i.e., to the L2 cache 215).

The processing elements 201-204 are grouped into subsets 227, 229 and the subsets 227, 229 are associated with corresponding L2 caches 215, 220. The L2 caches 215, 220 are therefore shared caches configured to cache information for the processing elements 201-204 of the subsets 227, 229. For example, the L2 cache 215 caches information for the processing elements 201, 202. As discussed above, if one of the processing elements 201, 202 issues a memory access request that misses in the corresponding L1 cache 211, 212, the memory access request is forwarded to the L2 cache 215. The requested information is returned to the requesting processing element 201, 202 if the memory access request hits in the L2 cache 215. The L2 cache 215 forwards the memory access requests to the next higher level of the cache (e.g., the L3 cache 225) if the memory access request misses in the L2 cache 215.

The L3 cache 225 is configured as a shared cache for the processing elements 201-204. Memory access requests from the processing elements 201-204 that miss in the L2 caches 215, 220 are forwarded to the L3 cache 225. The requested information is returned to the requesting processing element 201-204 if the memory access request hits in the L3 cache 225. The L3 cache 225 forwards the memory access request to the DRAM 105.1 if the memory access requests misses in the L3 cache 225. The cache hierarchy 200 also includes the cache index 170 and the cache controller 175 of FIG. 1.

Figure 3:
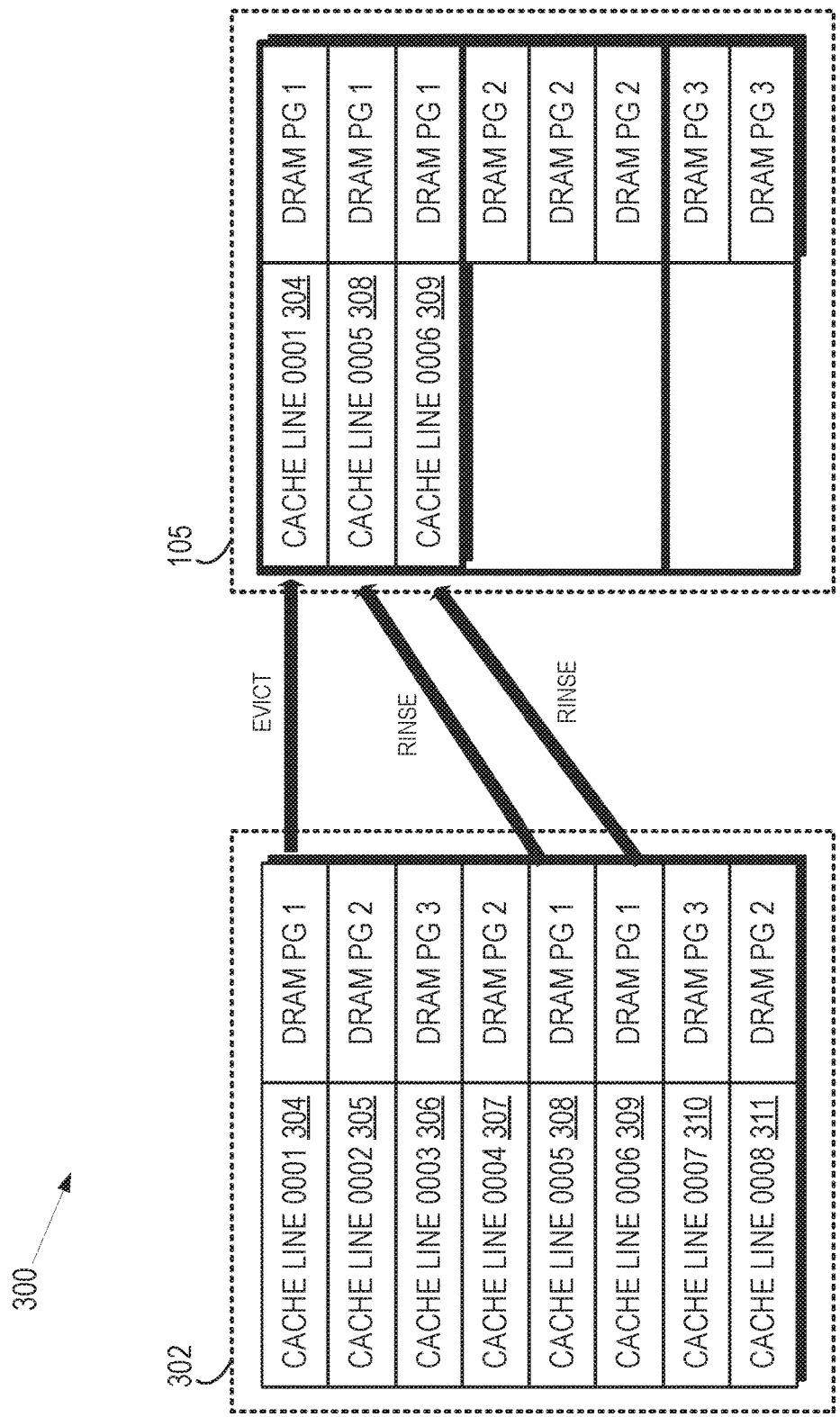
FIG. 3 is a block diagram illustrating an example of the processing system of FIG. 1 rinsing cache lines that share the same memory page as a cache line that is being evicted according to some embodiments.

FIG. 3 is a block diagram illustrating an example 300 of rinsing cache lines that share the same memory page as a cache line that is being evicted according to some embodiments. The example 300 illustrates a cache 302, corresponding to a level of the cache hierarchy 155, and including a plurality of cache lines 304-311. Each of the cache lines 304-311 is assigned to a page of the DRAM 105 page by the CPU 140. For example, cache line 304 stores data assigned to a memory address corresponding to a given DRAM page, designated PG 1, while cache line 305 stores data assigned to a different DRAM page, designated PG 2.

In response to identifying the cache line 304 for eviction, the cache controller 175 conducts a search of the cache 302 for cache lines in the modified state (sometimes referred to as "dirty" cache lines) that are associated with the same memory page—that is, are associated with DRAM PG 1—and are in the modified state. Thus, in the example 300, the cache controller 175 identifies cache lines 308 and 309. The cache controller 175 then writes each of the cache lines 304, 308, and 309 to the DRAM 105, sets the cache line 304 to the invalid state. In addition, the cache controller 175 sets the cache lines 308 and 309 to the unmodified state, and maintains each the cache lines 308 and 309 in the valid state. Thus, the cache controller 175 rinses data associated with the same memory page as the cache line 304 being evicted, and thereby improves write locality for the processing system 100.

Figure 4:
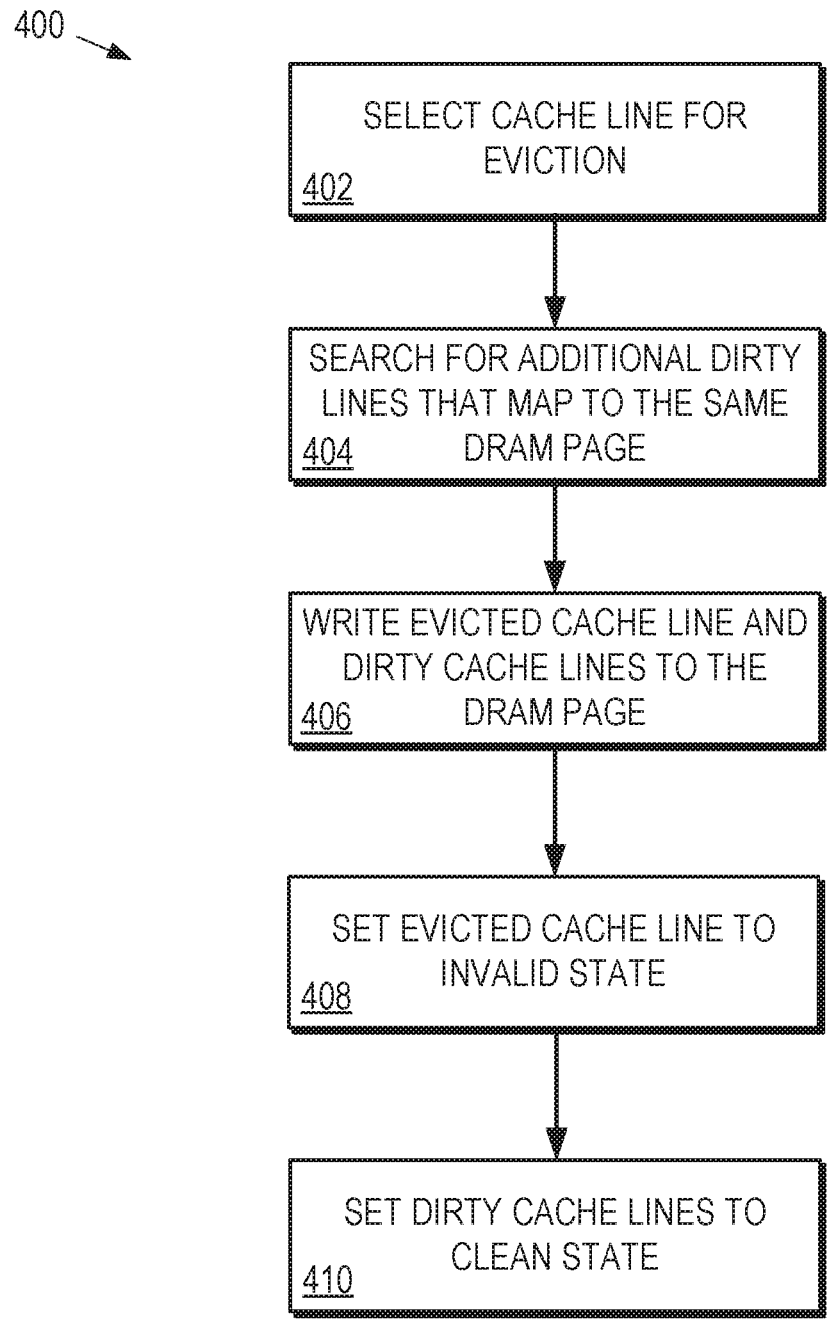
FIG. 4 is a flow diagram illustrating a method of rinsing, from a cache, those cache lines that share the same memory page as a cache line that is being evicted according to some embodiments.
Figure 5:
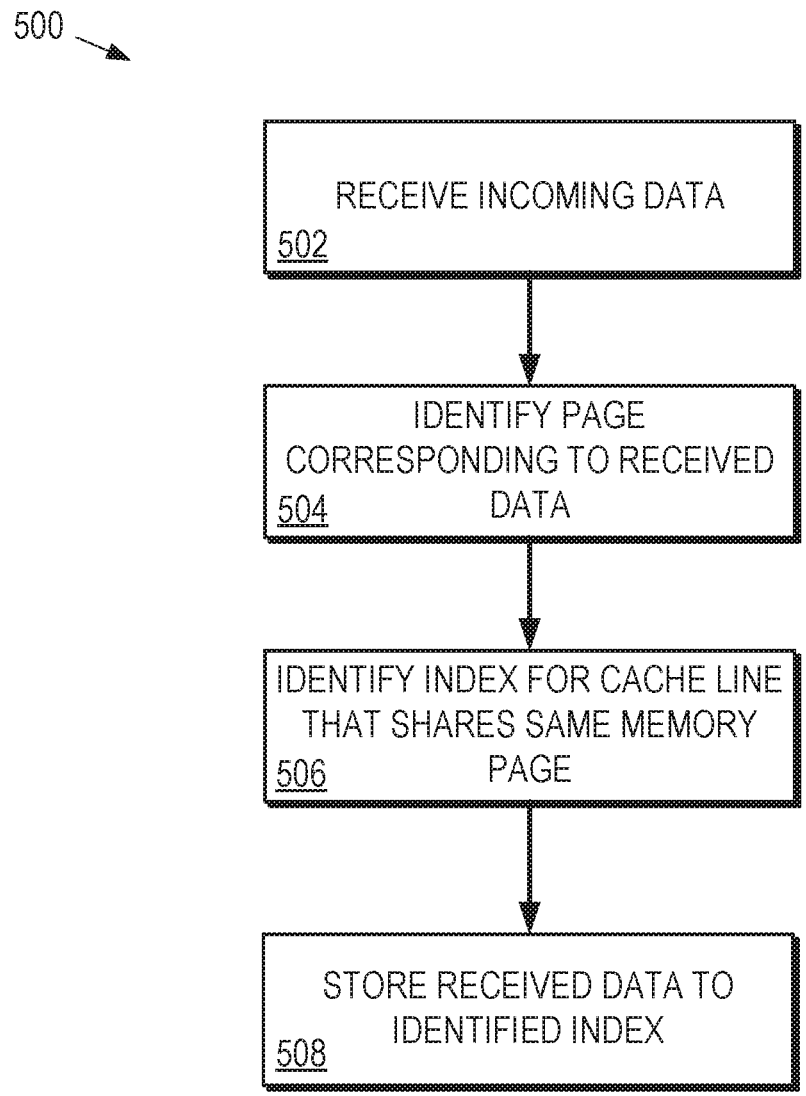
FIG. 5 is a flow diagram illustrating a method of storing cache lines that share the same memory page at the same index of a cache according to some embodiments.

FIG. 4 is a flow diagram illustrating a method 400 of improving write locality for processing system according to some embodiments. The method 400 is described with respect to an example implementation at the processing system 100 of FIG. 1. The method 400 begins at block 402 where the cache controller 175 identifies the cache line for eviction from the cache hierarchy 155 to the DRAM 105 in response to, for example, received data being designated for storage at the cache line. At block 404, the cache controller 175 searches the cache for modified (i.e., dirty) cache lines that are associated with the same memory page of the DRAM. At block 406, the cache controller 175 writes both the cache line identified for eviction at block 402 and the dirty cache lines identified at block 404 to the corresponding memory page of the DRAM 105. At block 408, the cache controller 175 sets the evicted cache line to the invalid state, indicating that the cache line is ready to store incoming data. At block 410, the cache controller 175 sets the dirty cache lines identified at block 404 to the unmodified (i.e., clean) state, but maintains the cache lines in the valid state to indicate that the cache lines are not available to store data associated with a different memory address.

In some embodiments, the cache controller 175 can further improve memory management by storing data associated with the same memory page at cache lines associated with the same index of a cache. By storing data in this way, the data can be quickly and efficiently rinsed to the same memory page according to the method 400 of FIG. 4. An example method 500 of storing cache lines that share the same memory page at the same index of a cache according to some embodiments. The method 500 is described with respect to an example implementation at the processing system 100 of FIG. 1. At block 502, the cache controller 175 receives data to be stored at a cache of the cache hierarchy 155. At block 504 the cache controller 175 identifies a memory page of the DRAM 105 for the memory address of the received data. At block 506, the cache controller 175 identifies an index of the cache that corresponds to the memory page identified at block 504. At block 508 the cache controller 175 stores the received data at a cache line of the identified index.

In some embodiments, the apparatus and techniques described above are implemented in a system comprising one or more integrated circuit (IC) devices (also referred to as integrated circuit packages or microchips), such as the processing system 100 described above with reference to FIGS. 1-5. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
    identifying, by a processor, a first cache line for eviction from a cache, the first cache line storing first data associated with a memory page; and in response to identifying the first cache line for eviction:
searching the cache for other cache lines storing data that is: associated with the memory page, is associated with a first index of a plurality of indices and has a dirty state;
in response to searching the cache, identifying a second cache line that stores second data; and
in response to identifying the second cache line, writing the first data and the second data to the memory page,
wherein the first index of the plurality of indices of the cache refers to both the first and second cache lines, and
wherein the first data and the second data are stored according to the first index.

2. The method of claim 1, further comprising:
in response to writing the second data to the memory page, setting the second cache line at the cache to a clean state.

3. The method of claim 2, further comprising:
in response to setting the second cache line to the clean state, maintaining the second cache line at the cache in a valid state.

4. The method of claim 3, further comprising:
in response to writing the first data to the memory page, setting the first cache line at the cache to an invalid state.

5. The method of claim 1, further comprising:
prior to identifying the first data for eviction, receiving the second data at the cache; and
in response to receiving the second data, and in response to identifying that the first data and the second data are both stored at the memory page, storing the second data at the second cache line, wherein a second index of the plurality of indices refers to a third cache line, and wherein the third cache line stores third data that is associated with a second memory page that is different from the memory page associated with the first and second cache lines.

6. The method of claim 5, further comprising:
in response to identifying the first cache line for eviction, searching cache lines associated with the first index for data associated with the memory page.

7. The method of claim 1, further comprising:
in response to searching the cache:
identifying a third cache line that stores third data associated with the memory page; and
in response to identifying the third cache line, writing the third data to the memory page.

8. The method of claim 1, wherein the first cache line and the second cache line have addresses that are separated by addresses of a plurality of other cache lines of the cache.

9. A method, comprising:
in response to identifying a first cache line for eviction from a cache, the first cache line storing first data associated with a first memory page:
identifying, at the cache, a first plurality of cache lines storing data corresponding to the first memory page; and
rinsing the first plurality of cache lines from the cache by writing the data stored at each of the first plurality of cache lines to a memory,
wherein identifying the first plurality of cache lines comprises:
identifying an index of the cache associated with the first cache line; and
searching the cache for the first plurality of cache lines associated with the index.

10. The method of claim 9, wherein rinsing further comprises:
maintaining each of the first plurality of cache lines in a valid state at the cache.

11. The method of claim 9, further comprising:
in response to identifying the first cache line for eviction, placing the first cache line in an invalid state at the cache.

12. The method of claim 9, further comprising:
in response to identifying a second cache line for eviction from the cache, wherein the second cache line stores second data associated with a second memory page that is different from the first memory page:
identifying a second plurality of cache lines at the cache storing data corresponding to the second memory page; and
rinsing the second plurality of cache lines from the cache by writing the data stored at each of the second plurality of cache lines to the memory.

13. The method of claim 12, wherein the first plurality of cache lines and the second plurality of cache lines are associated with different indices of the cache.

14. A processor, comprising:
a cache configured to store first data at a first cache line and second data at a second cache line, wherein the first data and the second data are associated with a memory page, the first cache line and the second cache line associated with a first cache index of a plurality indices, the first data stored at the first cache line and the second data stored at the second cache line according to the associated first cache index of the plurality of indices; and
a cache controller configured to:
identify the first cache line for eviction;
in response to identifying the first cache line, search the cache for other cache lines storing data that is: associated with the memory page, is associated with the first cache index of the plurality of indices and has a dirty state;
in response to searching the cache, identify the second cache line; and
in response to identifying the second cache line, write the first data and the second data to the memory page.

15. The processor of claim 14, wherein in response to writing the second data to the memory page, the cache controller is configured to set the second cache line at the cache to a clean state.

16. The processor of claim 15, wherein
in response to setting the second cache line to the clean state, the cache controller is configured to maintain the second cache line at the cache in a valid state.

17. The processor of claim 14, wherein
the cache controller is configured to:
prior to identifying the first data for eviction, receive the second data at the cache; and
in response to receiving the second data, and in response to identifying that the first data and the second data are both stored at the memory page, store the second data at a memory location referred to by the first cache index of the plurality of indices of the cache.

18. The processor of claim 17, wherein
in response to identifying the first cache line for eviction, the cache controller is configured to search cache lines referred to by the first index for data associated with the memory page.

19. The processor of claim 14, wherein
in response to the cache controller searching the cache, the cache controller is configured to:
identify a third cache line that stores third data associated with the memory page; and
in response to identifying the third cache line, write the third data to the memory page.

* * * * *

UNITED STATES PATENT AND TRADEMARK OFFICE
CERTIFICATE OF CORRECTION

| | |
|---|---|
| PATENT NO. | : 11,561,906 B2 |
| APPLICATION NO. | : 15/839089 |
| DATED | : January 24, 2023 |
| INVENTOR(S) | : William L. Walker and William E. Jones |

It is certified that error appears in the above-identified patent and that said Letters Patent is hereby corrected as shown below:

In the Claims

At Column 10 Line 22, please correct "cache lines to the memory." to be --cache lines to the second memory page.--

At Column 10 Line 32, please correct "first cache index of a plurality indices," to be --first cache index of a plurality of indices,--

At Column 10 Line 61, please correct "identifying the first data" to be --identifying the first cache line for eviction--

At Column 11 Line 4, please correct "by the first index for data" to be --by the first cache index for data--

Signed and Sealed this
Twelfth Day of September, 2023

*Katherine Kelly Vidal*

Katherine Kelly Vidal
*Director of the United States Patent and Trademark Office*